United States Patent
Novy et al.

(10) Patent No.: US 10,150,532 B2
(45) Date of Patent: Dec. 11, 2018

(54) GEAR DRIVEN BY WOBBLE MOVEMENT AND VEHICLE WITH THIS GEAR

(71) Applicant: COMTES FHT a.s., Dobrany (CZ)

(72) Inventors: Zbysek Novy, Letiny (CZ); Miroslav Urbanek, Tymakov (CZ); Filip Tikal, Plzen (CZ)

(73) Assignee: COMTES FHT a.s., Dobrany (CZ)

( * ) Notice: Subject to any disclaimer, the term of this patent is extended or adjusted under 35 U.S.C. 154(b) by 129 days.

(21) Appl. No.: 15/302,908

(22) PCT Filed: Dec. 30, 2014

(86) PCT No.: PCT/CZ2014/000166
§ 371 (c)(1),
(2) Date: Oct. 7, 2016

(87) PCT Pub. No.: WO2015/154727
PCT Pub. Date: Oct. 15, 2015

(65) Prior Publication Data
US 2017/0029064 A1  Feb. 2, 2017

(30) Foreign Application Priority Data
Apr. 10, 2014  (CZ) .................................... 2014-246

(51) Int. Cl.
*B60K 3/02* (2006.01)
*B62M 1/16* (2006.01)
(Continued)

(52) U.S. Cl.
CPC ............... *B62M 1/32* (2013.01); *B62K 17/00* (2013.01); *B62M 1/12* (2013.01); *B62M 1/14* (2013.01);
(Continued)

(58) Field of Classification Search
CPC .................................. B62K 3/002; B62M 1/16
See application file for complete search history.

(56) References Cited

U.S. PATENT DOCUMENTS 2,177,793 A * 10/1939 Taylor ...................... B62K 5/05
180/54.2
5,167,168 A * 12/1992 Beumer ................. A61G 5/023
280/250.1
(Continued)

FOREIGN PATENT DOCUMENTS

EP 1484241 B1 12/2004
WO 2009/051286 A1 4/2009

OTHER PUBLICATIONS

International Search Report dated Apr. 1, 2015 in Corresponding PCT/CZ2014/000166 (3 pages).
(Continued)

*Primary Examiner* — Tisha D Lewis
(74) *Attorney, Agent, or Firm* — Hovey Williams LLP

(57) ABSTRACT

A gear driven by wobble movement contains an ergonomic pendulum (D), a centric disk (C) and a flywheel (A) having a common axis (S) of rotation. In the axis (S) of rotation a shaft (H) is placed which is joined to the pendulum (D). The mutual concentric position of the centric disk (C) and the flywheel (A) is delimited by planet disk (B) which contacts the periphery of the centric disk (C) and the internal periphery of the flywheel (A) and is joined rotatably to the supporting structure (T). The supporting structure (T) is fixed to the linked structure which fixes the supporting structure (T), together with the planet disk (B), against rotation with respect to the axis (S) of rotation. A first freewheel (V1) is situated between the shaft (H) and flywheel (A) and a second freewheel (V2) is situated between the shaft (H) and centric disc (C).

3 Claims, 5 Drawing Sheets

(51) Int. Cl.
- B62M 1/32 (2013.01)
- B62M 1/14 (2006.01)
- B62M 1/38 (2013.01)
- B62K 17/00 (2006.01)
- B62M 1/12 (2006.01)
- B62M 11/02 (2006.01)
- F16F 15/30 (2006.01)
- F16H 1/28 (2006.01)
- F16H 31/00 (2006.01)
- B60B 21/00 (2006.01)
- B60B 27/02 (2006.01)
- B62K 3/00 (2006.01)
- B62K 5/02 (2013.01)

(52) U.S. Cl.
CPC ............... *B62M 1/16* (2013.01); *B62M 1/38* (2013.01); *B62M 11/02* (2013.01); *F16F 15/30* (2013.01); *F16H 1/28* (2013.01); *F16H 31/001* (2013.01); *B60B 21/00* (2013.01); *B60B 27/023* (2013.01); *B62K 3/00* (2013.01); *B62K 5/02* (2013.01)

(56) References Cited

U.S. PATENT DOCUMENTS

| | | | |
|---|---|---|---|
| 8,388,004 B2* | 3/2013 | Walter | B62K 3/002 280/244 |
| 9,677,416 B2* | 6/2017 | Weber | F01D 17/141 |
| 2010/0044995 A1* | 2/2010 | Park | B62K 3/002 280/246 |

OTHER PUBLICATIONS

Written Opinion of the International Searching authority dated Apr. 1, 2015 in Corresponding PCT/CZ2014/000166 (5 pages).

* cited by examiner

GEAR DRIVEN BY WOBBLE MOVEMENT AND VEHICLE WITH THIS GEAR

RELATED APPLICATIONS

This application is the National Stage of International Patent Application No. PCT/CZ2014/000166, filed Dec. 30, 2014, which is hereby incorporated by reference in its entirety, and which claims priority to Czech Application No. PV 2014-246, filed Apr. 10, 2014.

TECHNICAL FIELD

The proposed invention comes under the field of gears to transfer the power or torque, especially in vehicles driven by human power. Further it belongs to the field of the direct snap-mechanism-drive on a driven axle of wheel vehicles driven by a rider.

BACKGROUND ART

The most wide-spread vehicles, driven fully or partially by human power, are pedalling bicycles, pedalling three-wheels or electric bicycles respectively. This vehicle type is driven by treading pedals located on cranks which rotate a centric shaft steadily in equal sense of rotation. The centric shaft drives, by means of a chain, the shaft of a driven wheel or a driven pair of wheels in case of a tricycle. The vehicle is steered e.g. with a fork which is fastened rotatably in the bicycle frame. In this fork a front wheel is placed which is turned together with the turning fork. Due to fork turning together with the front wheel with respect to the frame with a rear wheel or a pair of rear wheels the vehicle can be steered and turned to the left or right.

In the electric bicycle or tricycle the front wheel (set of wheels) or the rear wheel (set of wheels) is driven additionally by a battery-fed electromotor. In this case the battery is located on the frame of the electric bicycle or tricycle. It is characteristic that the electric bicycle or tricycle needs riding person's cooperation. If the vehicle has to move on a plain or uphill, the riding person has to pedal as well because the electromotor only cannot drive the vehicle carrying a person.

The pedalling bicycle has many structural variants. The most important difference of individual variants consists in the location of the centric shaft, driven by cranks with pedals, and in transmitting the shaft movement to rotate the driven wheel.

The scooter is another similar vehicle. It is steered by means of a front-wheel rotatable fork too, similarly as in the pedalling bicycle or tricycle. The scooter is driven by rebounding of foot while the second riding person's foot stays on the scooter frame. The scooters can utilize the assistance of a driving electromotor as well.

The tricycle with the elliptical-principle drive is a further spread solution where the crank mechanism is rotated by a set of levers, driven by feet and hands of the riding person simultaneously. This tricycle has two lever mechanisms, one of them being controlled by right hand and right foot while the second one is controlled by left hand and left foot. Both of them move periodically which is transferred on a disk with two cranks. The cranks positions are turned by 180° mutually and the movement of the left mechanism is, with respect to the right one, shifted by half-period.

The rebounder is another human-driven vehicle. Usually, the rebounder is a single-trace double-wheel vehicle, the frame of which being modified so that a person may sit on it as on a bicycle or be hung on it. The riding person rides the vehicle in such a way that he rebounds from the ground by both feet.

Usually, the mentioned gears can be use also on training devices as pedalling devices or steppers.

DISCLOSURE OF INVENTION

The substance of the invention is a construction of a gear driven by wobble movement. The gear contains an ergonomic pendulum, a centric disk and a flywheel. These components have common axis of rotation. The pendulum is modified to be driven by one person at least. As a rule, it is modified to carry one person at least who swings on the pendulum with creating rocking or wobble movement respectively. In the common axis of rotation of the pendulum, of the centric disk and of the flywheel a shaft is located and joined rigidly to the pendulum.

The mutual concentric position of the centric disk and the flywheel is delimited by one planet disk at least, but three ones usually, which establish contact with the outer periphery of the centric disk and the internal periphery of the flywheel and are fastened to a supporting structure. It follows that the senses of rotation of the centric disk and the flywheel are different.

The supporting structure is fixed to a linked structure, said linked structure including this gear. Therefore, the position of supporting structure, together with the planet disks, is fixed against rotation relatively to the axis of rotation. The first freewheel is situated between the shaft and the flywheel. A second freewheel is located between the shaft and the centric disk. The senses of rotation of the freewheels are different. With the shaft not rotating, it means that the freewheels enable the flywheel to move in opposite sense of rotation with respect to the centric disk.

The wobble or rocking movements respectively of the pendulum rotate the flywheel in one constant direction. It is made so that with the pendulum moving in the first direction, the pendulum is tied with the flywheel by means of the shaft and the locked-up first freewheel. Therefore, the pendulum movement in the first direction rotates the flywheel in the first direction.

With the pendulum moving in the second direction, the first freewheel is unlocked and the second one is locked up. Due to it the shaft is tied with the centric disk. The centric disk rotates the planet wheels by rotating in the second direction. Then, the planet wheels rotate the flywheel in the first direction. It is advantageous if an elastic element is mounted between the ergonomic pendulum and the supporting or linked structure respectively. This element defines the limiting positions of the ergonomic pendulum and stabilizes the wobbling frequency. Advantageously, the elastic element is made in the coiled-spring form. Depending on concrete practical utilization of the gear, the outer flywheel periphery is modified to ensure further torque transmission. With the gear being part of a simple vehicle or e.g. a training device, it is advantageous if the outer flywheel periphery is a wheel tread.

In another case the outer flywheel periphery can be modified for mounting a belt or a chain or to be linked to further gear. This can be made either by means of a peripheral groove or a spur or lateral teeth. The longitudinal groove can be utilized to install a driving belt to drive linked gears or, in the contrary, to install a friction belt or other friction segment in case it is utilized in a training device. The spur gearing can be fitted e.g. with a tooth belt, chain or a tooth wheel. With the lateral teeth the transmission to further tooth gear with direct, bevel or conical teeth can be supposed.

The described gear can be utilized advantageously for a construction of a vehicle. In such case the linked structure to which the supporting structure is fastened is frame-shaped. To the frame a controllable wheel or pair of wheels is fastened. The vehicle is steered, in the sense of its turning to the left or right, by inclining of the riding person with the ergonomic pendulum and of the whole set of the flywheel with a planet gear. In riding, the geometric wheel-tread shape ensures swivelling of the shaft axis into the inclined direction by flywheel inclining. Further, there is a special joint on the frame joining this set to an additional wheel. With the flywheel set being inclined, this joint ensures the change of the shaft axis angle with respect to rear wheel or pair of wheels axis. The angle change helps the whole vehicle to turn without problems.

The exemplary embodiment of the vehicle with the gear according to the invention can be designed as a tricycle with one front wheel and two rear wheels. The front wheel diameter can be larger than that of the rear wheels, the front wheel being driven and steered directionally at the same time.

The riding person stands on the bottom part of the ergonomic pendulum and controls the top part thereof by hands. With transferring the centre of gravity in the direction of riding and utilizing his own power, the riding person makes the ergonomic pendulum wobble which drives the flywheel in the form of the front wheel, the axis of which being identical with that of the pendulum. The supporting structure, joining the axes of the planet wheels, is joined to the axle of the pair of wheels. The connection of the front wheel with the pair of wheels contains a joint enabling to steer the vehicle directionally. If the vehicle has to turn, the riding person shifts the centre of gravity to needed side due to which the front wheel with the pendulum is inclined. With the front wheel being inclined, the whole vehicle turns thanks to joint function because the axes of the front wheel and the rear pair of wheels cease to be parallel. The joint has a well-known structure and is utilized as a component of steerable skateboard axle. The brakes are common jaw or disk ones which are used in bicycles.

BRIEF DESCRIPTION OF DRAWINGS

The exemplary realization of the proposed invention is described with reference to drawings on which is.

BEST MODE FOR CARRYING OUT THE INVENTION

The gear driven by wobble movement contains the ergonomic pendulum D, the centric disk C and the flywheel A having the common axis S of rotation. The pendulum D is adapted to carry one person. In the axis S of rotation, the shaft H, joined rigidly to the pendulum D, is placed. The mutual concentric position of the centric disk C and the flywheel A is delimited by three planet disks B which contact the outer periphery of the centric disk C and the internal periphery of the flywheel A, said planet disks B being joined rotatably to the supporting structure T. The supporting structure T is fixed to the linked structure, said linked structure including this gear. The position of the supporting structure T is, together with the planet disks B, fixed against rotation with respect to the axis S of rotation.

Between the shaft H and the flywheel A the first freewheel V1 is situated. Between the shaft H and the centric disk C the second freewheel V2 is located. The senses of rotation of the freewheels V1 and V2 are different.

In this case the outer periphery of the flywheel A is a wheel tread. The linked structure to which the supporting structure T is fastened has the form of the frame U to which a pair of wheels K is fastened. The connection of the front wheel and the pair of wheels K contains the joint J which enables the vehicle to be steered directionally. If the vehicle has to be turned, the riding person transfers the centre of gravity to the needed side due to which the front wheel is inclined with the ergonomic pendulum D too. With the front wheel being inclined, the whole vehicle is turned thanks to the function of the joint J because the axes of the front wheel and of the rear pair of wheels K cease to be parallel. The joint J has a well-known structure and is utilized usually as a part of a steerable axle of a skateboard.

Figure 1:
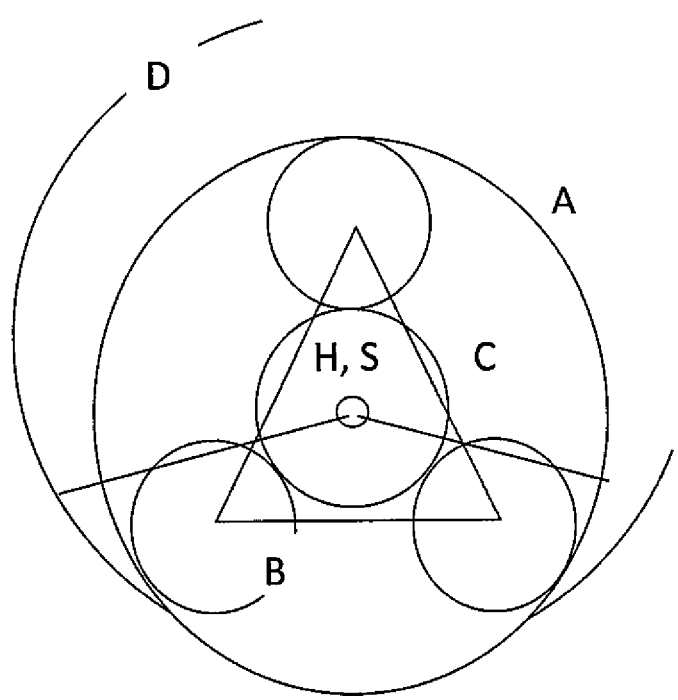
FIG. 1—schematic illustration of the gear-structure principle.
Figure 2:
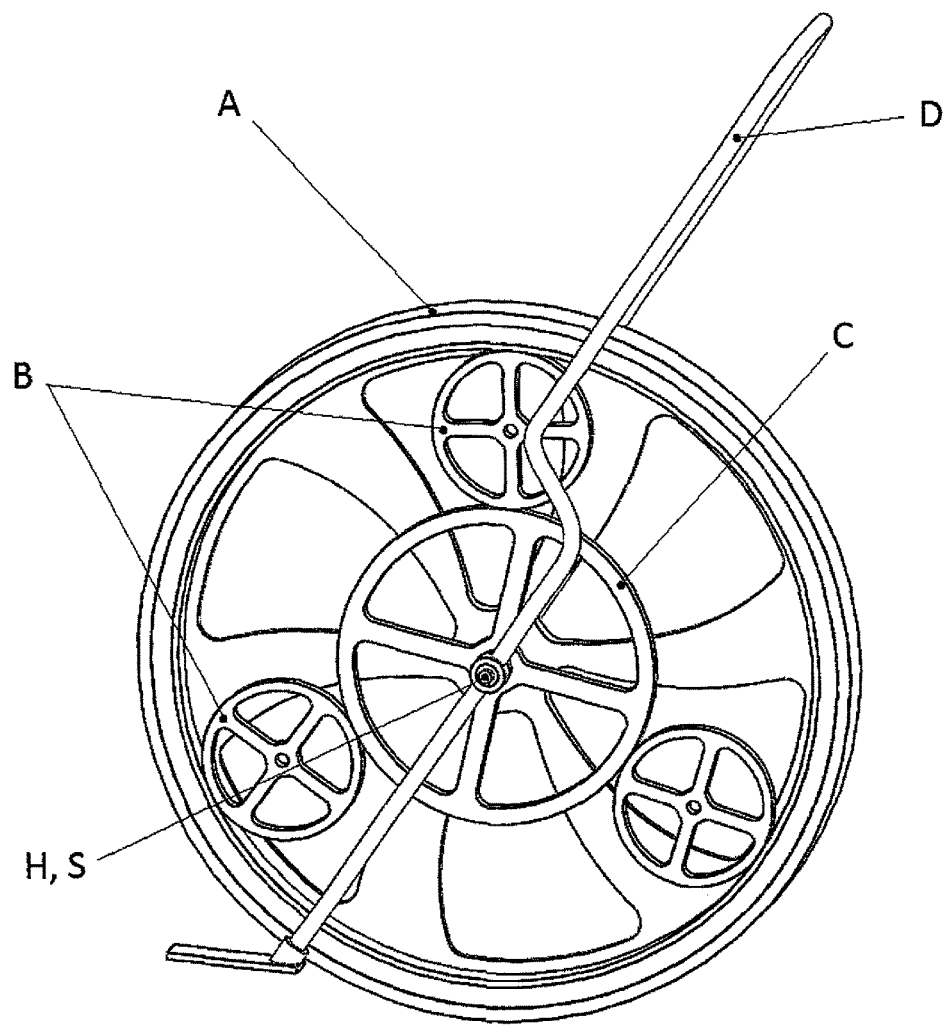
FIG. 2—view of the gear with the pendulum adapted to support one person with a non-depicted structure supporting planet disks.
Figure 3:
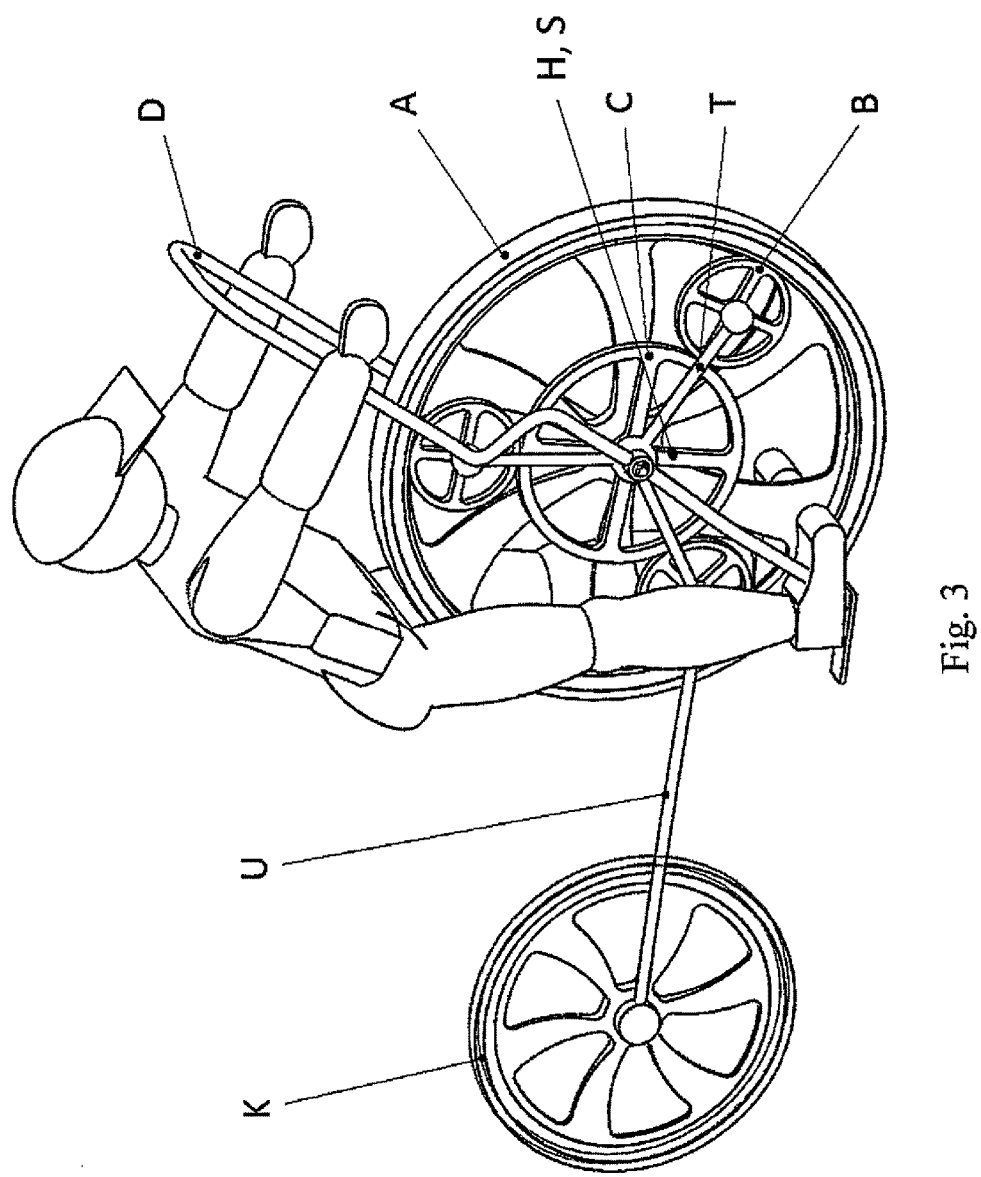
FIG. 3—schematic illustration of a single-trace vehicle with the gear and with a carried person.
Figure 4:
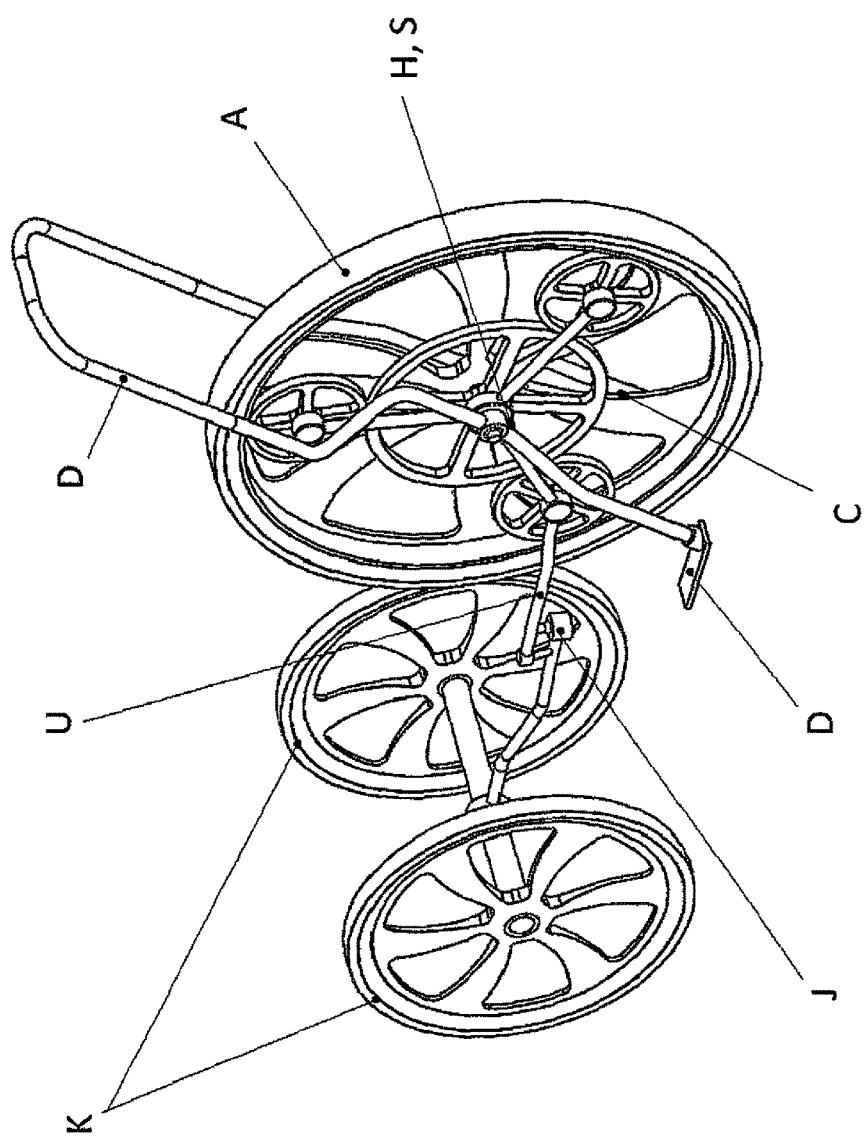
FIG. 4—schematic illustration of a multi-trace vehicle with the gear.
Figure 5:
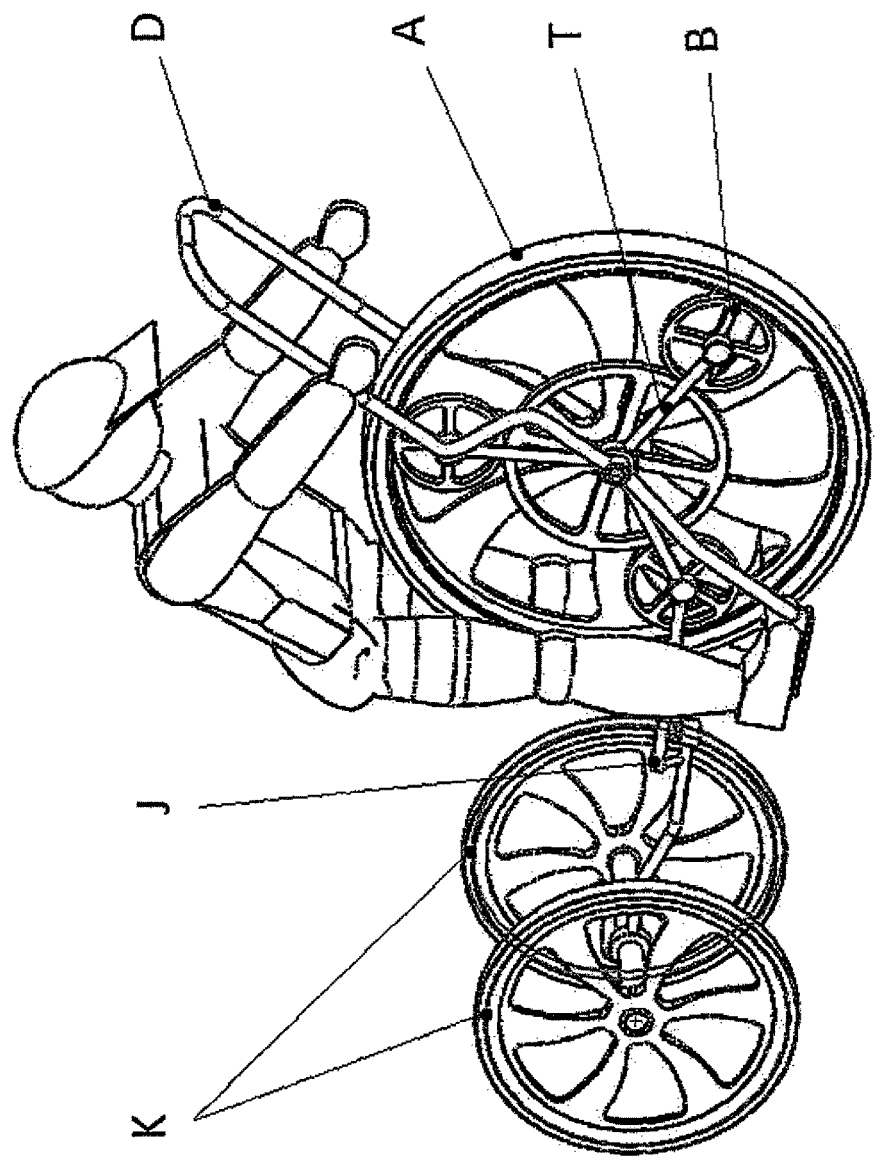
FIG. 5—schematic illustration of a multi-trace vehicle with the gear and a carried person.

An exemplary embodiment can be found on FIG. 1, FIG. 2, FIG. 3, and FIG. 5.

LIST OF REFERENCE SYMBOLS

A—flywheel
B—planet disk
C—centric disk
D—ergonomic pendulum
H—shaft rigidly joined to the pendulum
K—wheel
J—joint
S—axis of rotation of the pendulum, disk and flywheel
T—supporting structure in the tops of which there are centres of the planet disks
U—frame
V1—first freewheel
V2—second freewheel

INDUSTRIAL APPLICABILITY

The proposed gear will find its application in smaller transport means as bicycles, sledge or vessels especially. It can be utilized further e.g. for training device which is analogous to a pedalling training device or stepper or possibly to drive arbitrary smaller machines and devices.

The invention claimed is:

1. A gear driven by wobble movement, said gear containing:
   a driving pendulum adapted to be driven by a person;
   a centric disk, wherein said driving pendulum and said centric disk have a common axis of rotation, wherein a shaft is located in the common axis of rotation;
   a flywheel positioned at said common axis of rotation, wherein the shaft is rigidly joined to the driving pendulum, wherein the mutual position of said centric disk and said flywheel is delimited by a planet disk that contacts the outer periphery of said centric disk and the internal periphery of said flywheel, wherein said planet disk being rotatably joined to a supporting structure, wherein said supporting structure is fixed to a linked structure that connects said supporting structure with the planet disk against rotation with respect to said common axis of rotation;
a first freewheel situated between said shaft and said flywheel; and
a second freewheel situated between said shaft and said centric disk, wherein the senses of rotation of said first freewheel and said second freewheel are different,
wherein the outer periphery of the flywheel is a wheel tread.

2. The gear driven by wobble movement according to claim 1, wherein the flywheel is adapted to mount a belt, a chain, or a toothed wheel.

3. A vehicle comprising the gear according to claim 1, wherein the linked structure has a form of a frame to which a wheel or a pair of wheels is fastened.

* * * * *